Jan. 16, 1968  A. N. BLADES  3,363,468
LIQUID SAMPLING DEVICE
Filed Nov. 30, 1965  2 Sheets-Sheet 1
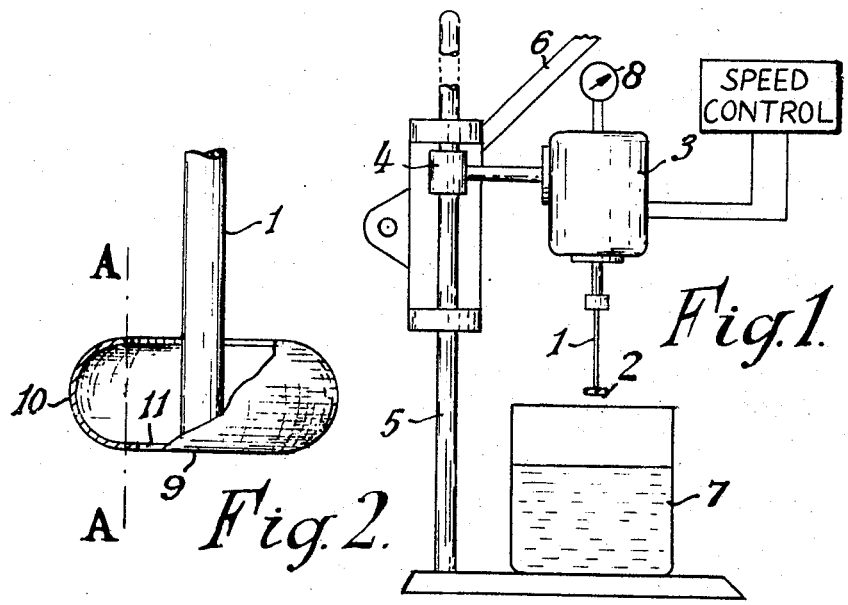
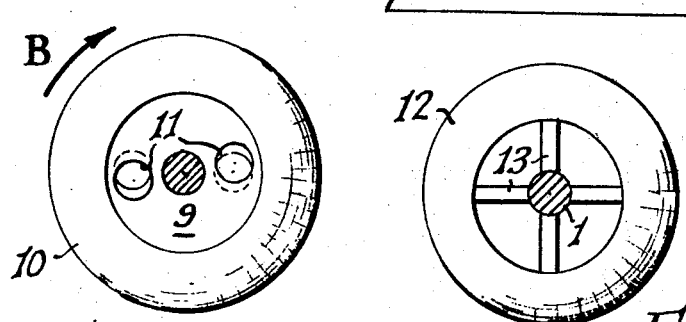
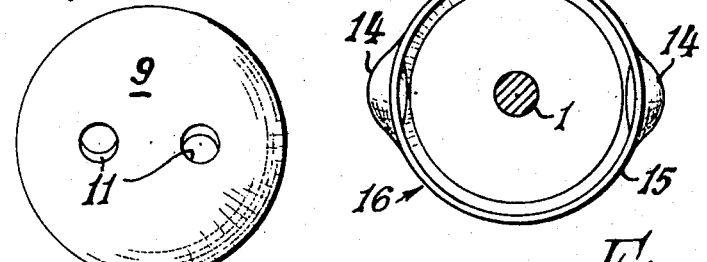
Inventor:
ALFRED N. BLADES
By Howson & Howson
Attorneys.

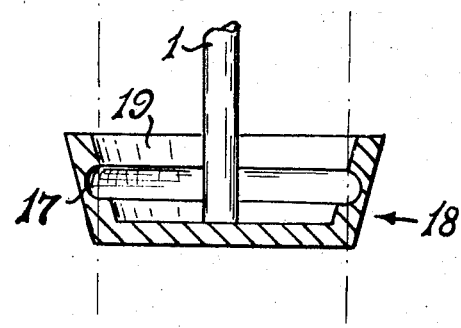
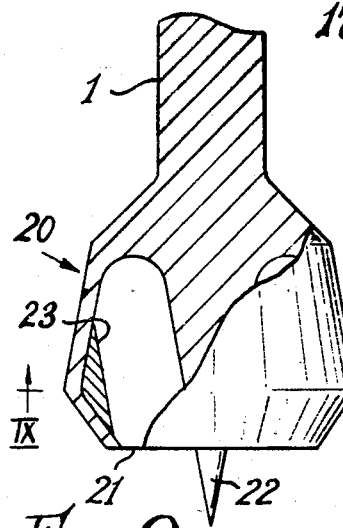
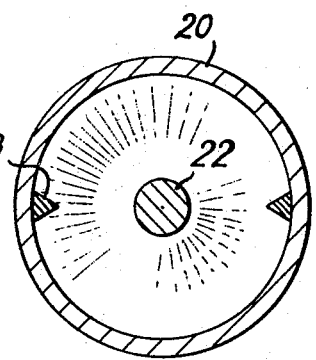
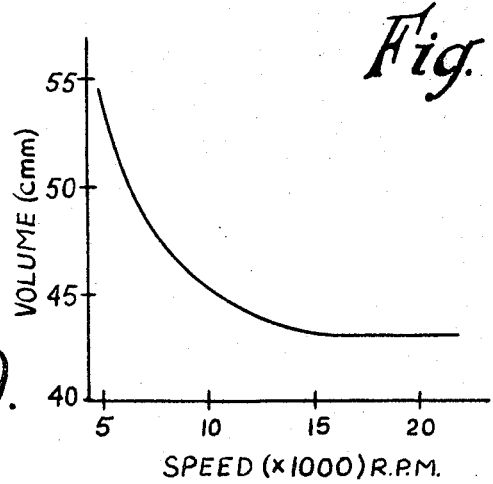

United States Patent Office 3,363,468
Patented Jan. 16, 1968

3,363,468
LIQUID SAMPLING DEVICE
Alfred Nigel Blades, 18 Manor Road,
Dorchester, Dorsetshire, England
Filed Nov. 30, 1965, Ser. No. 510,585
Claims priority, application Great Britain, Dec. 10, 1964,
50,254/64
14 Claims. (Cl. 73—425.4)

This invention relates to a process and apparatus for the sampling of an accurately reproducible volume of liquid. Specifically, though not exclusively, the invention relates to a process and apparatus for sampling and subsequently dispensing a volume of liquid for dilution purposes.

It is sometimes necessary to sample an accurately determinable volume of a standard or stock solution of a liquid (homogeneous or otherwise) for addition to a known volume of diluent, and the method and apparatus of this invention affords a simple means of carrying out such sampling. The invention therefore has useful applications in haemotological or serological analysis or similar quantitative estimations.

According to one feature of the present invention a process for the sampling of an accurately reproducible volume of liquid comprises rotating a liquid catchment means containing an excess of liquid so that the required volume of liquid is retained in the catchment means by centrifugal force while the excess liquid is spun off. The catchment means may be filled with liquid prior to rotation, or, more usually, the catchment means may be lowered, while rotating, into a reservoir of liquid. Where the sample of liquid is subsequently required for dilution, the catchment means, still containing its retained volume of liquid, is immersed in a metered volume of diluent.

According to a further feature of the present invention, apparatus for sampling an accurately reproducible volume of liquid comprises a shaft, catchment means secured to said shaft defined by a reentrant wall portion opening towards the shaft and spaced radially therefrom, and means for rotating the shaft about its longitudinal axis.

The catchment means may be one or more discrete calicular members spaced radially from and introversive to the axis of the shaft and where a plurality of catchment means is employed, the calicular members are preferably symmetrically disposed with respect to the axis in a plane normal thereto. The catchment means in a preferred embodiment of apparatus is defined by a continuous reentrant wall surface having the same arcuate cross-section in any plane through the axis and which in any given plane normal to the axis defines a circle concentric with the axis, the surface being concave in the direction towards said axis.

The catchment means may be attached to the shaft by a system of supporting means. Alternatively, the catchment means may be defined by the internal wall surface of a single circular open vessel, which may be mounted on the shaft so that its open end is uppermost or lowermost when in use. When the open end is uppermost, the base of the vessel may have one or more holes formed therein. Where holes are formed in the base of the vessel, it is convenient to incline them with respect to the shaft so that on rotation of the vessel in a reservoir of liquid, liquid is forced up through the base and into the vessel by relative rotation between vessel and reservoir.

The shaft is attached at, or adjacent to, one end to the catchment means and the other end of the shaft is connected to a motive source, which imparts rotational movement to the catchment means. Since, within a certain speed range, the volume sampled depends on the rotational speed of the catchment means, there is advantage in coupling a tachometer to the shaft to give a direct indication of the rotational speed of the shaft.

The catchment means may be made of any convenient material for example, metal, plastics material, glass or ceramics. If desired the surfaces of the catchment means may be coated with a hydrophobic material innocuous to both liquid and diluent, to reduce the adherence of the liquid being sampled to the catchment means. The catchment means may be constructed from a highly refractory material (e.g. platinum) so that it can be bacteriologically sterilised in a flame.

The invention will now be described, by way of example, with reference to the accompanying drawing, in which:

FIGURE 1 is a schematic view of the complete apparatus,

FIGURE 2 is a part sectional side elevation of the sampling head of the apparatus of FIGURE 1, shown on an enlarged scale, FIGURES 3 and 4 are plans from above and below, respectively, of the head of FIGURE 2.

FIGURES 5 and 6 are plans from above of alternative forms of head,

FIGURE 7 is a sectional side elevation of a further alternative form of head,

FIGURE 8 is a part sectional side elevation, of a still further alternative form of head, FIGURE 9 is a section on the line IX—IX of FIGURE 8, and FIGURE 10 is a graph showing the volume retained within the head of FIGURES 8 and 9 as a function of rotational speed.

Referring to FIGURE 1, the apparatus which forms a rotary pipette, comprises a shaft 1, a sampling head 2 secured to one end of the shaft 1 and a motor 3 for rotating the shaft at high speed about its axis. The motor 3 is mounted on a bush 4 slidably supported on a stand 5 and connected to a pivoted lever 6 which enables the shaft 1 and sampling head 2 to be raised or lowered into a reservoir of liquid in a container 7. A tachometer 8 measures the speed of rotation of the sampling head 2.

Referring to FIGURE 2, the sampling head can be seen to comprise a calicular vessel having a base 9 secured to the shaft 1 and a curved side wall 10. Two holes 11 are formed in the base 9 each being inclined to the shaft 1. The axes of the holes 11 are diametrically disposed relative to the shaft 1 and are inclined in the same sense, so that on rotation of the vessel in the direction of the arrow B in FIGURE 3 with the vessel immersed in liquid, liquid is scooped up through the holes 11 to flow upwardly through the vessel and ensure mixing of the liquid in the reservoir. If the vessel is now lifted clear of the free surface of the liquid, a volume of liquid will be retained in the vessel by centrifugal force, while the excess liquid will be spun off. As the rotational speed of the vessel increases the volume of liquid retained is reduced, until above a certain rotational speed (and assuming the centrifugal force generated is not sufficient either to expand the vessel or to compress the liquid) the retained volume reaches a minimum. The line AA in FIGURE 2, defines the catchment means of the wall 10, within which this minimum volume of liquid is ultimately retained when the vessel is rotated at a sufficiently high rotational speed.

The mode of operation of the apparatus shown in FIGURE 1 will now be described for the specific case of the estimation of haemoglobin in medical laboratory work, which involves an accurate dilution of a small sample of blood. With the shaft 1 rotating at high speed, the head 2 is lowered into a reservoir of the blood of which an estimation is to be made. By virtue of the inclined holes 11, the vessel rapidly fills with a well mixed sample of blood and is then lifted clear of the reservoir. Excess blood is removed from the vessel by the resulting centrifugal force so that the only blood remaining in the vessel is that which is trapped in the catchment means by the outwardly radially directed centrifugal force. The head, still rotating, is then lowered into a bath of diluent. The effect of the holes 11 now causes diluent to flow upwardly through the vessel washing the blood sample out of the catchment means and mixing it thoroughly with diluent. When mixing and dilution is judged to be complete, the head, still rotating, is withdrawn from the diluent.

In a specific apparatus of the kind illustrated in FIGURES 2 to 4, the head was 2 mm. deep (i.e. measured in the axial direction of the shaft 1) with a maximum diameter of 5 mm. and was made of platinum. When operated at a rotational speed of 10,000 r.p.m. the head transferred a volume of approximately 10 cmm. with an accuracy of better than 1%.

The apparatus is of particular utility in performing a series of haematological estimations, in which the head passes alternately into reservoirs of specimens and metered baths of diluent, the head being sterilised and dried after each dilution, by being passed through a flame.

FIGURE 5 shows an alternative form of head in which the vessel of FIGURES 2, 3 and 4 is replaced by an annular shell 12 attached to the shaft 1 by a supporting means 13. The supporting means is conveniently in the form of stirring blades inclined with respect to a plane normal to the axis of the spindle. In this way, effective stirring of the reservoir is obtained when a sample is taken and adequate stirring and mixing of sample with diluent occurs when the transfer of sample to bath of diluent is effected.

FIGURE 6 shows yet another form of head, in which the catchment means is defined by two dimples 14 formed in the side wall 15 of a vessel 16. The wall 15 slopes outwardly with respect to the shaft 1.

FIGURE 7 shows a further form of head in which a continuous groove 17 of semi-circular cross-section forms a reentrant wall portion of a vessel 18 and defines the catchment means. The side wall 19 of vessel 18 is also inclined outwardly with respect to the shaft 1, to ensure complete removal of excess liquid from the vessel.

The embodiments of FIGURES 6 and 7 can be charged with a liquid sample by placing a few drops of liquid (e.g. from a Pasteur pipette) into the vessel while stationary and then rotating the vessel to spin off the excess liquid.

FIGURES 8 and 9 show a further embodiment of head, in which the vessel 20 opens downwardly and in which an extension 22 of the shaft 1 projects through the opening 21 to the vessel. The extension 22 tapers to a point and facilitates the flow of liquid into the vessel 20 when the rapidly rotating head is dipped into a reservoir of liquid.

To use the head of FIGURES 8 and 9, the shaft would be rotated at a speed of 15,000 r.p.m. and immersed first into a liquid sample and then into a reservoir of diluent, the head being rotated at constant speed throughout. In order to generate turbulence within the head and to ensure that it is a representative volume which is sampled and that the retained volume is fully flushed out of the head by the diluent, it is preferred to disrupt the symmetry of the internal surface of the head by means of the protuberances 23.

The apparatus in accordance with the invention readily lends itself to fully automatic operation and electrical means can be employed to sense electrical contact between the head and the reservoirs of sample material and diluent (e.g. by connecting the head and reservoirs into an electric control circuit). Such electrical control is particularly useful in the case of diluting a sample where a plurality of "dips" of the head into the diluent may be required.

Although a smoothly tapered extension 22 is shown in FIGURES 8 and 9, and is quite satisfactory, for the sampling of many materials, it may be desirable to provide the extension with stirring paddles or a helical groove in the case of heavy sludges or suspensions.

Normally, for routine quantitative estimations, the apparatus will be employed at a fixed operating speed (e.g. 15,000–20,000 r.p.m.) and one head will be used for sampling one particular volume. Alternatively, however, the apparatus can be operated at differing speeds and a single head can thus be employed to sample different volumes depending on the actual rotational speed employed. FIGURE 10 shows a typical graph (actually obtained with the head of FIGURES 8 and 9) of rotational speed (in r.p.m.) against volume (in cmm.) retained. By calibrating any particular head it is possible to mark the scale readings of the tachometer directly in volume. By suitable design of the head, the speed/volume relationship can be made to be linear over a major part of the speed range.

If desired, the surfaces of the heads illustrated in FIGURES 2 to 9 may be coated with a hydrophobic material innocuous to both liquid and diluent, to reduce the adherence of the liquid being sampled to the head.

It will be appreciated that the particular heads illustrated are purely exemplary and that many alternative designs can be envisaged which would be equally suitable in practice.

What is claimed is:

1. A process for the sampling of a volume of liquid and its subsequent dilution in a liquid diluent comprising the steps of:
   (a) immersing a catchment means rotating about a vertical axis below the free surface of a quantity of the liquid to be sampled,
   (b) lifting the rotating catchment means from the liquid surface, to retain a volume of liquid in the catchment means by centrifugal force and allow excess liquid to spin off and then
   (c) immersing the catchment means still rotating into a volume of liquid diluent to effect mixing of the retained volume in the diluent.

2. A process as claimed in claim 1, in which the catchment means is rotated throughout the sampling and diluting operations at a constant speed in excess of 10,000 revolutions per minute.

3. A process for sampling a volume of liquid from a reservoir of such liquid maintained in a container comprising the steps of:
   (a) rotating a symmetrical open cup-shaped member having an inwardly directed reentrant wall portion about the axis of symmetry,
   (b) immersing the rotating cup-shaped member below the free surface of the liquid in the container,
   (c) lifting the rotating cup-shaped member from the free surface of the liquid, and
   (d) allowing liquid to spin off the cup-shaped member until only the volume retained trapped in the reentrant wall portion by centrifugal force remains.

4. A process as claimed in claim 3, in which the cup-shaped member is rotated at the same speed throughout.

5. A process as claimed in claim 4, in which the cup-shaped member is rotated at a speed in excess of 10,000 revolutions per minute.

6. A process for sampling a volume of liquid from a reservoir of such liquid comprising the steps of:
   (a) immersing a symmetrical cup-shaped member having an inwardly directed concave wall which is symmetrical about an axis collinear with a straight supporting shaft of the cup-shaped member,
   (b) rotating the shaft about said axis as it is lifted from the liquid, and
   (c) allowing liquid to spin out of the cup-shaped member until only a volume retained trapped in the concave wall by centrifugal force remains.

7. A process as claimed in claim 6, in which the rotational speed is set depending on the volume of liquid it is desired to sample.

8. A liquid sampling device comprising a motor, a straight shaft extending from the motor and rotatable about its longitudinal axis by the motor and liquid catchment means attached to the shaft and symmetrically about a plane passing through the axis of the shaft.

9. A liquid sampling device comprising an electric motor, a straight shaft extending from the motor and rotatable about its longitudinal axis by the motor, speed control means for controlling the speed of revolution of the shaft and an open cup-shaped member attached to the shaft to define an inwardly directed concave surface which is symmetrical about the axis of the shaft.

10. A liquid sampling device as claimed in claim 9, in which the cup-shaped member opens towards the motor, the opposite end of the cup-shaped member forming a base wall supporting the concave surface and being provided with at least one hole whose axis is inclined relative to the shaft.

11. A liquid sampling device as claimed in claim 9, in which the cup-shaped member opens in the direction away from the motor.

12. A liquid sampling device as claimed in claim 11, in which the symmetry of the concave surface is broken by protuberances extending inwardly of the cup-shaped member.

13. A liquid sampling device as claimed in claim 11, in which the shaft extends through the cup-shaped member and projects in a point beyond the open end of the cup-shaped member.

14. A liquid sampling device comprising a straight shaft, catchment means secured to said shaft defined by a reentrant wall portion opening towards the shaft and spaced radially therefrom, and means for rotating the shaft about its longitudinal axis.

References Cited
UNITED STATES PATENTS 3,252,331   5/1966   Lancaster _____ 73—425.4

FOREIGN PATENTS 234,220   5/1925   Great Britain.

LOUIS R. PRINCE, *Primary Examiner.*

S. C. SWISHER, *Assistant Examiner.*